United States Patent [19]

Mori

[11] Patent Number: 5,800,306

[45] Date of Patent: Sep. 1, 1998

[54] METHOD AND SYSTEM FOR CONTROLLING AUTOMATIC POWER TRANSMISSION

[75] Inventor: Akimasa Mori, Fuji, Japan

[73] Assignee: Jatco Corporation, Fuji, Japan

[21] Appl. No.: 726,471

[22] Filed: Oct. 4, 1996

[30] Foreign Application Priority Data

Oct. 12, 1995 [JP] Japan ................................ 7-264041

[51] Int. Cl.$^6$ .................................................. F16H 61/00
[52] U.S. Cl. ............................ 477/62; 477/64; 477/175
[58] Field of Search .............................. 477/62, 63, 64, 477/65, 174, 175

[56] References Cited

U.S. PATENT DOCUMENTS

| | | | |
|---|---|---|---|
| 4,715,145 | 12/1987 | Takeda et al. | 477/65 X |
| 5,318,159 | 6/1994 | Kashiwabara | 477/169 |
| 5,520,594 | 5/1996 | Fukasawa et al. | 477/173 |
| 5,527,233 | 6/1996 | Tabata et al. | 477/62 |
| 5,573,473 | 11/1996 | Asayama et al. | 477/65 X |
| 5,580,334 | 12/1996 | Minowa et al. | 477/169 X |
| 5,655,996 | 8/1997 | Ohtsuka | 477/175 X |
| 5,665,029 | 9/1997 | Minowa et al. | 477/169 X |
| 5,681,238 | 10/1997 | Minowa et al. | 477/102 |

OTHER PUBLICATIONS

Patent Abstract of Japan, abstract of ABE, "Engine Control Device In Vehicle With Automatic Transmission", Japanese 63–105247, May 10, 1988.

Primary Examiner—Charles A. Marmor
Assistant Examiner—Peter T. Kwon
Attorney, Agent, or Firm—Foley & Lardner

[57] ABSTRACT

An automatic power transmission assembled with a torque converter includes a lock-up mechanism for controlling the automatic power transmission with detecting a state of progress of a shifting operation in the automatic power transmission. A driving torque of an engine is temporarily lowered at a timing in the vicinity of completion of the shifting operation. The timing is determined by calculating data indicative of the state of progress of the shifting operation of the automatic power transmission on the basis of the result of a ratio value, which is determined by multiplying a transmission gear ratio (Gn) at a transmission speed range of the automatic power transmission after shifting with a rotation speed (Np) of an output shaft of the automatic power transmission and dividing the result by a revolution speed (Ne) of an engine connected to the torque converter detecting a state of the lock-up mechanism between a lock-up state and a non-lock-up state, modifying shifting timing indicative reference data depending upon the state of the lock-up mechanism and detecting the timing when the calculated data reaches the reference data.

14 Claims, 6 Drawing Sheets

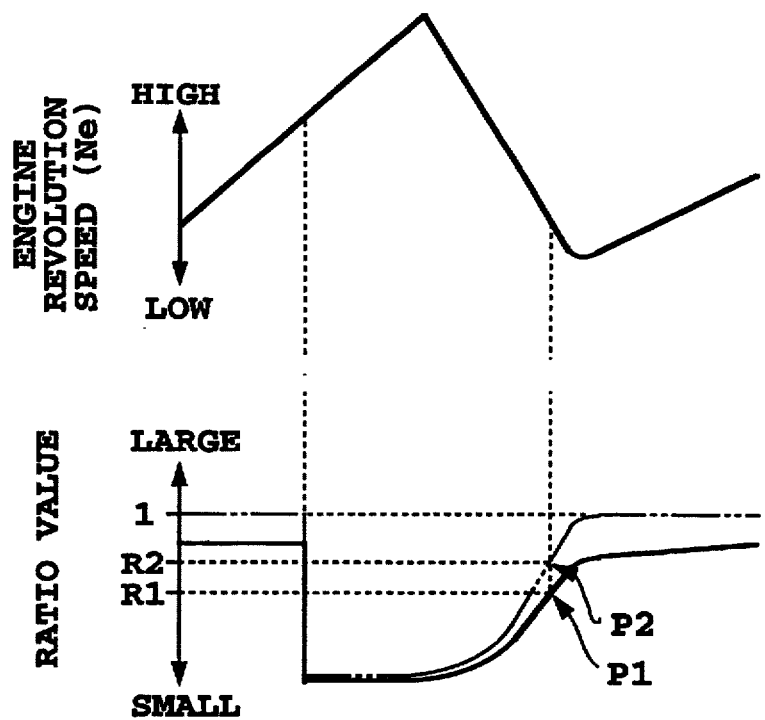
FIG.4A
FIG.4B
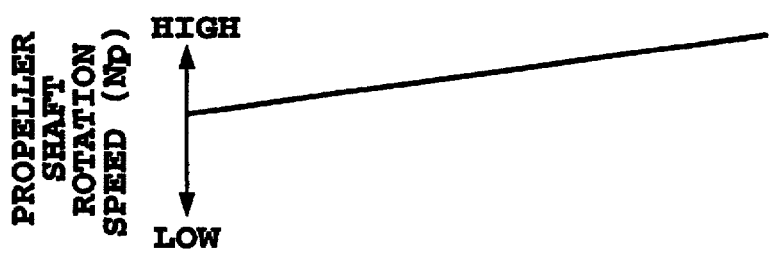
FIG.4C

METHOD AND SYSTEM FOR CONTROLLING AUTOMATIC POWER TRANSMISSION

BACKGROUND OF THE INVENTION

1. Field of the Invention

The present invention relates to a method and a system for controlling an automatic power transmission, to which a torque converter with a lock-up mechanism is assembled.

2. Description of the Related Art

Conventionally, in an automatic power transmission shiftable to desired transmission speed ranges by selectively engaging a plurality of friction engagement elements, magnitude of a shift shock is significantly variable depending upon engaging timing of the friction engagement elements. Therefore, an engaging timing of the friction engagement elements with a state of progress of a shifting operation being graspped is controlled. Also, there has been proposed a control system for reducing a shift shock by detecting a timing in the vicinity of completion of shifting on the basis of the state of progress in the shifting operation and lowering a driving torque of an engine at the detected timing (Japanese Patent Application Laid-open No. Showa 63-105247).

On the other hand, in order to obtain data for detecting the state of progress in the shifting operation of the automatic power transmission, there has been proposed a system detecting an engine revolution speed and utilizing the same in place of a rotation speed of an input shaft of the automatic power transmission. When the rotation speed of the input shaft of the automatic power transmission is to be detected, it becomes necessary to provide a sensor between an output shaft of a torque converter and an input shaft of the automatic power transmission and to expand axial length between the output shaft of the torque converter and the input shaft of the automatic power transmission. In contrast to this, when the engine revolution speed is to be detected, the problem set forth above will not be caused, number of parts can be reduced, and down-sizing of the automatic power transmission becomes possible.

However, in the conventional control system set forth above, no measure has been taken for the case where a torque converter with a lock-up mechanism is assembled. Therefore, when the torque converter with the lock-up mechanism is assembled, a state of progress of shifting operation in the automatic power transmission cannot be detected accurately. Namely, since the lock-up mechanism of the torque converter is operated to mechanically engage an input shaft and the output shaft of the torque converter, data for detecting the state of progress of shifting operation in the automatic power transmission is inherently fluctuated depending upon engaging conditions of the lock-up mechanism.

For example, when the data for detecting the state of progress in the shifting operation in the automatic power transmission is to be obtained on the basis of a result of calculation (hereinafter referred to as a "ratio value") of $(G_n \cdot N_p)/N_e$, assuming an engine revolution speed being $N_e$, a rotation speed of a propeller shaft as an output shaft of the automatic power transmission being $N_p$ and a transmission gear ratio at a transmission speed range after shifting of the automatic power transmission being $G_n$, the ratio value can be varied depending upon whether the lock-up mechanism of the torque converter is in an engaging state or not. FIGS. 6A, 6B and 6C respectively show variation of the engine revolution speed ($N_e$), the ratio value and the rotation speed ($N_p$) of the propeller shaft corresponding to the rotation speed of the output shaft of the automatic power transmission during up-shifting. In FIG. 6B, the solid line shows variation of the ratio value while the lock-up mechanism is in a disengaged state, and the two-dotted line shows variation of the ratio value while the lock-up mechanism is in a engaged state. Here, consideration is given for the case where judgement is made that a timing in the vicinity of completion of the shifting operation is reached to lower the driving torque of the engine at a timing at which the ratio value reaches a reference value ($R_o$), for reducing a shift shock.

In such a case, when the lock-up mechanism is in a disengaged state, timing (P11) is judged as the timing in the vicinity of completion of the shifting operation, whereas when the lock-up mechanism is in the engaged state, timing (P12) is judged as the timing in the vicinity of completion of the shifting operation. Consequently, the timing to judge as the timing in the vicinity of completion of the shifting operation can be fluctuated making it impossible to accurately detect the state of progress of the shifting operation in the automatic power transmission. Therefore, it becomes impossible to precisely perform optimization of the driving torque of the engine.

SUMMARY OF THE INVENTION

Therefore, it is an object of the present invention to provide a method and a system for controlling an automatic power transmission that can obtain data for detecting a state of progress of shifting operation in the automatic power transmission by detecting an engine revolution speed in place of a rotation speed of the input shaft of the automatic power transmission, and can accurately detect the state of progress of shifting operation in the automatic power transmission on the basis of the data thus obtained.

Another object of the present invention is to provide a method and a system for controlling an automatic power transmission that can accurately detect the state of progress of shifting operation in the automatic power transmission irrespective of the state of the lock-up mechanism in the torque converter by calculating the data for detecting the state of progress of shifting operation in the automatic power transmission on the basis of the engine revolution speed, the rotation speed of the output shaft of the automatic power transmission and the transmission gear ratio at the transmission speed range after shifting in the automatic power transmission, and, upon making judgement for the timing in the vicinity of completion of the shifting operation by comparing the calculated data and the reference data, by modifying the reference data depending upon the engaging condition of the lock-up mechanism of the torque converter.

A further object of the present invention is to provide a method and a system for controlling an automatic power transmission, in which the state of progress of shifting operation in the automatic power transmission can be accurately detected by also modifying the reference data on the basis of at least one of the transmission speed range of the automatic power transmission, the engine revolution speed and the engine load, or depending upon shifting direction, i.e., up-shifting or down-shifting, in the automatic power transmission.

In a first aspect of the present invention, there is provided a method for controlling an automatic power transmission assembled with a torque converter, including a lock-up mechanism, by detecting a state of progress of a shifting operation in the automatic power transmission, comprising the steps of:

obtaining data indicative of the state of progress of the shifting operation of the automatic power transmission on the basis of the result of calculation of (Gn·Np)/Ne based on a revolution speed (Ne) of an engine connected to the torque converter, a rotation speed (Np) of an output shaft of the automatic power transmission, and a transmission gear ratio (Gn) at a transmission speed range of the automatic power transmission after shifting;

detecting a state of the lock-up mechanism between a lock-up state and a non-lock-up state;

modifying reference data depending upon the state of the lock-up mechanism;

judging a timing in the vicinity of completion of the shifting operation and outputting a judgement signal when the calculated data reaches the reference data, and actuating to reduce a shift shock of the shifting operation in response to the judgement signal.

Here, the method may further comprise the step of:

modifying the reference data on the basis of at least one of a transmission speed range, the engine revolution speed (Ne) and an engine load.

The method may further comprise the step of:

modifying the reference data depending upon up-shifting or down-shifting of the shifting operation in the automatic power transmission.

In a second aspect of the present invention, there is provided a system for controlling an automatic power transmission assembled with a torque converter, including a lock-up mechanism by detecting a state of progress of a shifting operation in the automatic power transmission, comprising:

engine revolution speed detecting means for detecting a revolution speed (Ne) connected to the torque converter;

output shaft rotation speed detecting means for detecting rotation speed (Np) of an output shaft of the automatic power transmission;

transmission gear ratio detecting means for detecting a transmission gear ratio (Gn) at a transmission speed range in an automatic power transmission after shifting;

arithmetic means for obtaining data indicative of the state of progress of the shifting operation of the automatic power transmission on the basis of the result of calculation of (Gn·Np)/Ne;

engaging state detecting means for detecting a state of the lock-up mechanism between a lock-up state and a non-lock-up state;

reference data modifying means for modifying reference data depending upon the state of the lock-up mechanism;

judgement means for judging a timing in the vicinity of completion of the shifting operation and outputting a judgement signal when the calculated data reaches the reference data; and means for actuating to reduce a shift shock of the shifting operation in response to the judgement signal.

Here, the reference data modifying means may modify the reference data on the basis of at least one of a transmission speed range, the engine revolution speed (Ne), and an engine load.

The reference data modifying means may modify the reference data depending upon up-shifting or down-shifting of the shifting operation in the automatic power transmission.

In a third aspect of the present invention, there is provided a system for controlling an automatic power transmission, which includes a torque converter with a lock-up mechanism, comprising:

first means for detecting an engine speed (Ne) of an engine connected to the automatic power transmission through the torque converter;

second means for detecting an output speed (Np) of the automatic power transmission;

third means for deriving data indicative of a state of progress of shifting of transmission speed range from one transmission speed range to another transmission speed range on the basis of the engine speed (Ne), the output speed (Np) and a known transmission gear ratio (Gn) at the another transmission speed range;

fourth means for detecting a state of the lock-up mechanism;

fifth means for modifying shift completion indicative reference data on the basis of the state of the lock-up mechanism detected by the fourth means;

sixth means for comparing the data derived by the third means and the reference data modified by the fifth means and for judging a timing where shifting of transmission speed range from the one transmission speed range to the another transmission speed range is about completion and outputting a judgement signal when the derived data reaches the reference data; and seventh means for actuating to reduce a shift shock of the shifting operation in response to the judgement signal.

Here, the fourth means may detect a state of the lock-up mechanism on the basis of magnitude of slippage across the torque converter.

The reference date may comprise a first reference ratio value (R1) for the non-lock-up state of the lock-up mechanism and a second reference ratio value (R2) for the lock-up state of the lock-up mechanism.

The fifth means may modify the second reference ratio value (R2) at a given constant value and the first reference ratio value (R1) at a value smaller than the second reference ratio value (R2) and becoming smaller as increasing the engine speed (Ne) when up-shifting.

The fifth means may modify the second reference ratio value (R2) at a given constant value and the first reference value (R1) at a value greater than the second reference ratio value (R2) and becoming greater as increasing the engine speed (Ne) when down-shifting.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIGS. 4A, 4B and 4C are explanatory charts showing a judgement operation to be taken place in a judgement portion in FIG. 2;

DESCRIPTION OF THE PREFERRED EMBODIMENT

The preferred embodiment of a method and a system for controlling an automatic power transmission will be discussed in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail to concisely disclose the present invention.

One embodiment of the present invention will be discussed with reference to FIGS. 1 to 5. The shown embodiment shows an application for a control system, in which a shift shock is reduced by lowering a driving torque of an engine at a timing in the vicinity of completion of shifting operation in an automatic power transmission.

Figure 1:
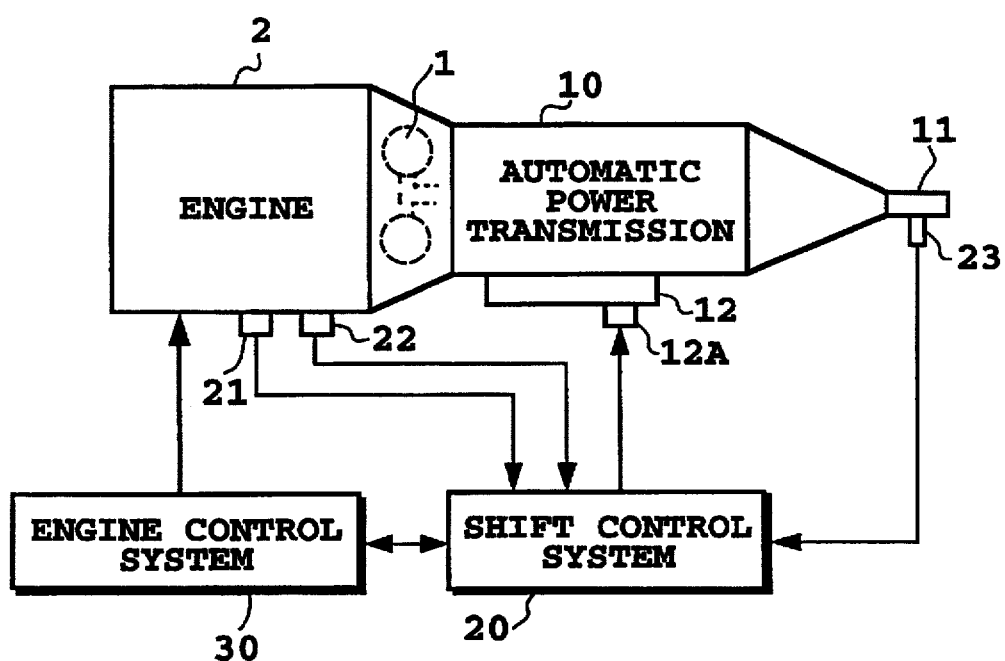
FIG. 1 is a schematic block diagram showing a general construction of one embodiment of a control system according to the present invention.
Figure 2:
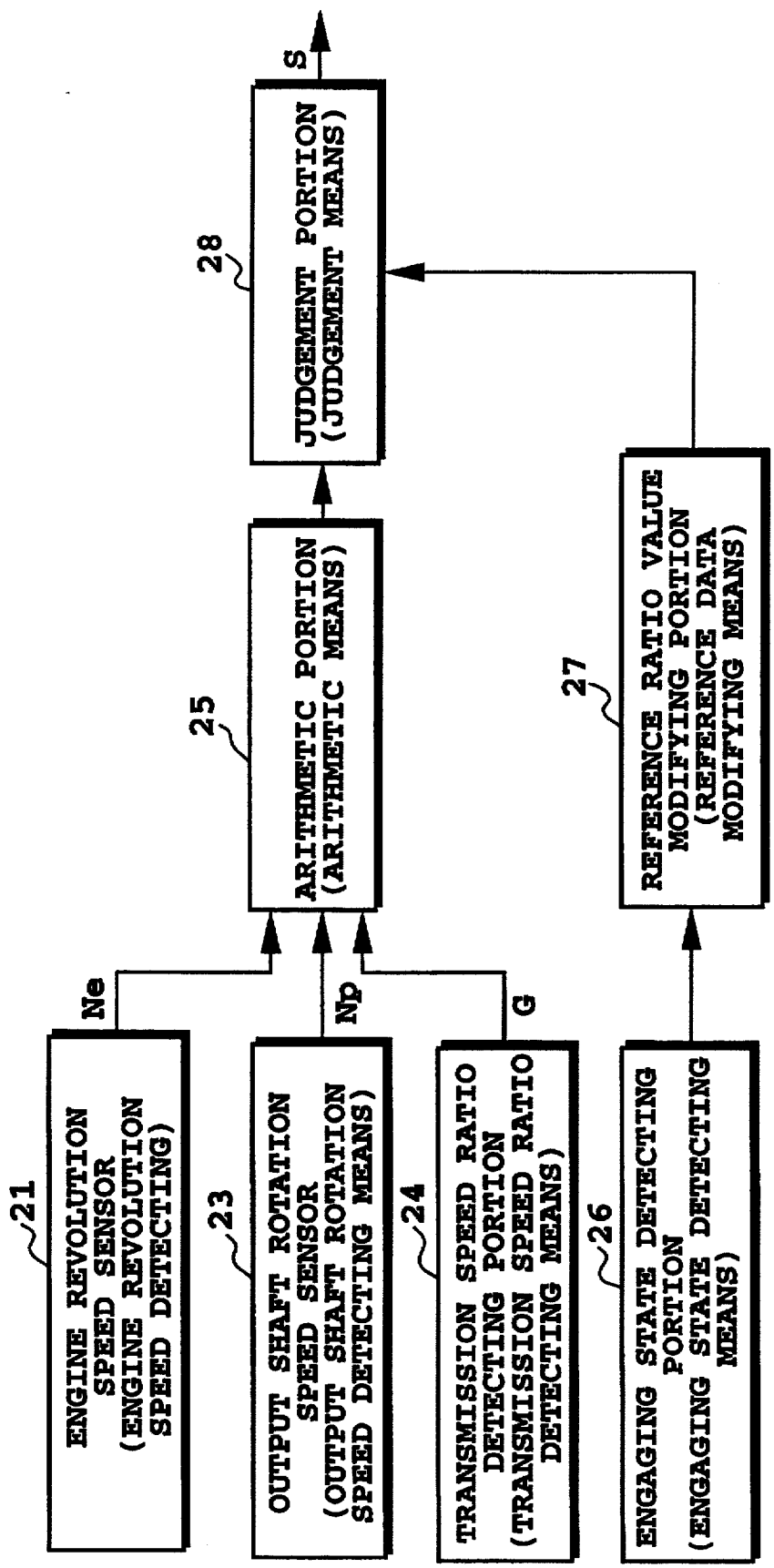
FIG. 2 is a block diagram showing the major part of one embodiment of the control system of the invention.

FIG. 1 is a block diagram showing a general construction of a control system of an automatic power transmission and an automotive engine. An input shaft of an automatic power transmission 10 is connected to an output shaft of the engine 2 via a torque converter 1 with a lock-up mechanism, and an output shaft 11 of the automatic power transmission 10 is connected to a propeller shaft. A hydraulic control apparatus 12 is provided in the automatic power transmission 10. In the hydraulic control apparatus 12, power supply condition of a plurality of shift solenoids 12A are selectively switched by a shift control system 20 for selectively engaging and disengaging a plurality of friction engagement elements for selectively establishing a desired power transmission ratio in the automatic power transmission 10. To the shift control system 20, an engine speed sensor 21 as an engine revolution speed detecting means for detecting a revolution speed of the engine, a throttle angle sensor 22 for detecting an open degree of a throttle valve, and an output shaft rotation sensor 23 as an output shaft rotation speed detecting means for detecting a rotation speed of a propeller shaft corresponding to a rotation speed of an output shaft 11 are connected. In the shift control system 20, as shown in FIG. 2, has a transmission speed ratio detecting portion 24 as a transmission speed range detecting means for detecting a shifting transmission speed ratio currently being shifted in the automatic power transmission 10, an engaging condition detecting portion 26 as an engaging condition detecting means for detecting engaging condition of a lock-up mechanism of the torque converter 1, an arithmetic portion as an arithmetic means for computing data of a state of progress in a shifting operation in the automatic power transmission 1, a reference ratio value modifying portion 27 as a reference data modifying means and a judgement portion 28 as a judgement means.

Function of respective portions of the shift control system will be discussed later with operation.

On the other hand, to the shift control system 20, an engine control system 30 is also connected. The engine control system 30 has a function for temporarily lowering a driving torque of the engine 2 at a timing in the vicinity of completion of the shifting operation of the automatic power transmission, as discussed later. Temporarily lowering of the driving torque of the engine is realized by controlling a spark ignition timing, a fuel injection amount and so forth.

Next, operation will be discussed.

At first, the shift control system 20 performs calculation of (Gn·Np)/Ne in the arithmetic portion 25 using an engine revolution speed (Ne) detected by the engine speed sensor 21, a rotation speed (Np) of the output shaft 11 detected by the output shaft rotation sensor 23 and the transmission gear ratio (Gn) at the transmission speed range after shifting detected by the transmission speed ratio detecting portion 24 to obtain data (hereinafter referred to as a "ratio value") for detecting a state of progress in the shifting operation in the automatic power transmission 10. The judging portion 28 compares the ratio value with a reference ratio value as the reference data and makes judgement that a timing in the vicinity of completion of shifting operation is reached upon detection of the ratio value reaching the reference ratio value to output a judgement signal (S). The reference ratio value can be modified depending upon an engaging condition of the lock-up mechanism of the torque converter 1 by the reference ratio value modifying portion 27. The engaging condition of the lock-up mechanism is detected by the engaging condition detecting portion 26.

The engaging condition detecting portion 26 detects the engaging condition of the lock-up mechanism on the basis of an operation duty (hereinafter referred to as a "lock-up duty") of the lock-up solenoid introducing actuation pressure in the lock-up mechanism and a slip magnitude of the torque converter 1. Controlling of this lock-up duty is disclosed in U.S. Pat. No. 5,086,894, which is incorporated herein by reference. Here, the lock-up duty becomes a predetermined value (D1) at initial stage in initiation of engagement of the lock-up mechanism. On the other hand, the slip magnitude is derived through an arithmetic expression of Ne−(Np·Gc), and when the slip amount exceeds a predetermined value (S0) judgement is made that the lock-up mechanism is in the disengaged state. Here, Gc is a transmission gear ratio of the transmission speed range before judgement of shifting, and the predetermined value (S0) may be set in a range of about 50 to 100 r.p.m.

Figure 3:
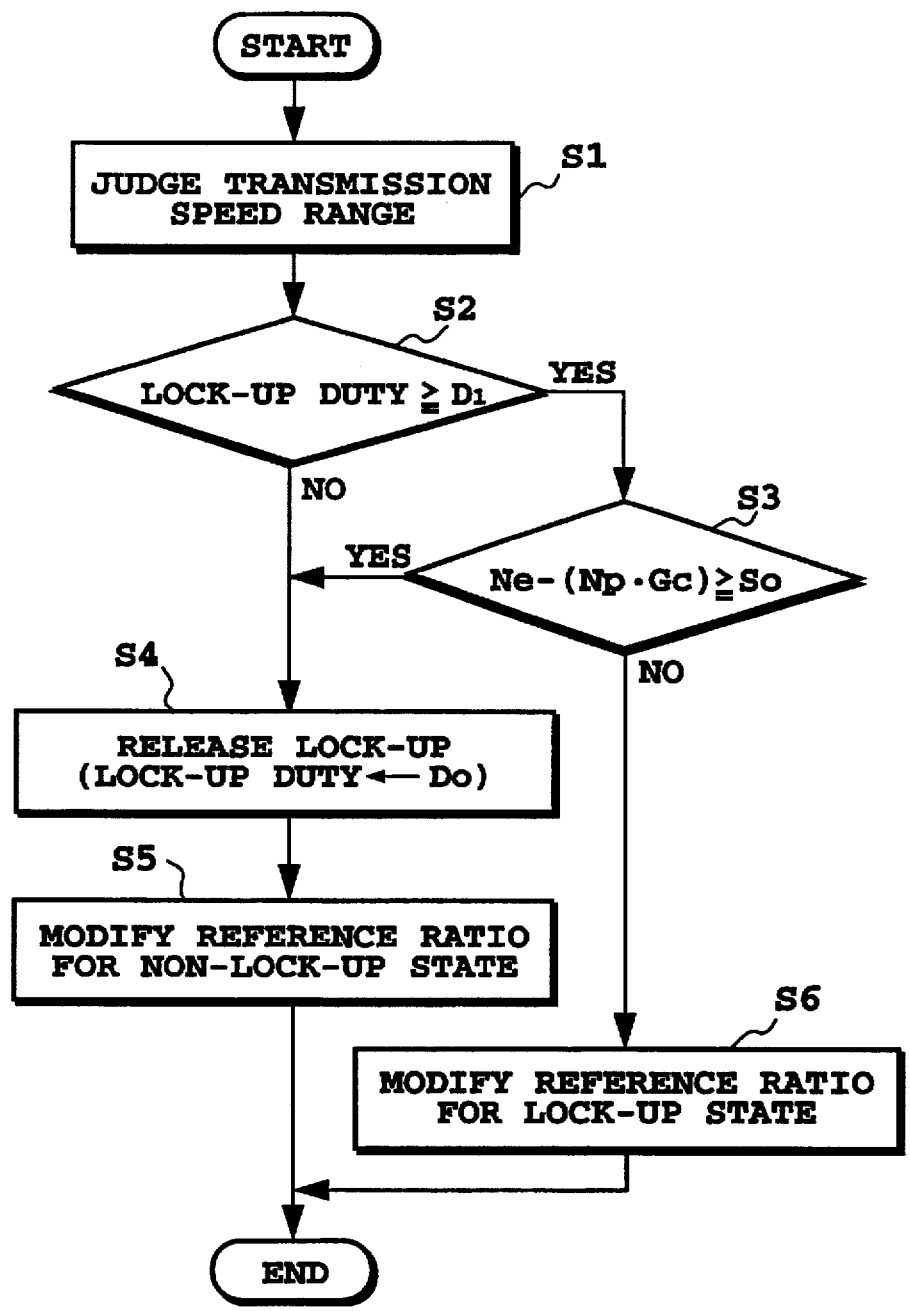
FIG. 3 is a flowchart for explaining operation of an engaging condition detecting portion and a reference ratio value modifying portion in FIG. 2.

FIG. 3 is a flowchart for explaining the operation for modifying the reference ratio value.

At first, at step S1, judgement is made for transmission speed range of the automatic power transmission 10, namely for shifting up or shifting down, and shifting start transmission speed range and targeted transmission speed range. The judgement may be made on the basis of the control signal for the shift solenoid 12A in the hydraulic control apparatus 12, for example.

Then, judgement is made whether the lock-up duty is greater than or equal to the predetermined value (D1) at initial stage in initiation of engagement of the lock-up mechanism, or not (step S2). If the lock-up duty is not greater than or equal to the predetermined value (D1), the lock-up duty is forcedly set at a value D0 (step S4). The value (D0) is a value indicative that the lock-up mechanism is released from an engaged state (hereinafter referred to as a "lock-up state") and thus is in a disengaged state (hereinafter referred to as a "non-lock-up state" or a "slipping state"). After setting the lock-up duty at the value (D0) at step S4, the reference ratio value modifying portion 27 sets reference ratio value (R1) for the non-lock-up state as the reference ratio value (see FIG. 4). On the other hand, if the lock-up duty at step S2 is greater than or equal to the predetermined value (D1), judgement is made whether or not the slip magnitude exceeds reference value (S0) (step S3). If the slip magnitude as checked at step S3 is in excess of the reference value (S0), judgement is made that the lock-up state is not yet established in the lock-up mechanism. Then, the process is advanced to step S4. When the slip magnitude is not in excess of reference value (S0), judgement is made that the lock-up state is established. Then, the reference ratio value modifying portion 27 sets reference ratio value (R2) (see FIG. 4) as the reference ratio value (step S6).

The judgement portion 28 makes judgement for a timing in the vicinity of completion of the shifting operation on the basis of the reference ratio value modified by the reference ratio value modifying portion 27. Namely, when the lockup mechanism is in the non-lock-up state, the ratio value as data for detecting the state of progress of shifting operation in the automatic power transmission is compared with reference ratio value (R1) to output the judgement signal (S) with judgement that the timing in the vicinity of completion of the shifting operation is reached when the ratio value reaches reference ratio value (R1). On the other hand, when the lock-up mechanism is in the lock-up state, the ratio value as data for detecting the state of progress of shifting operation in the automatic power transmission is compared with reference ratio value (R2) to output the judgement signal (S) with judgement that the timing in the vicinity of completion of the shifting operation is reached when the ratio value reaches reference ratio value (R2).

FIGS. 4A, 4B and 4C show variation of the engine revolution speed (Ne) upon up-shifting, the ratio value and the rotation speed (Np) of the propeller shaft corresponding to the rotation speed of the output shaft 11. In FIG. 4B, the solid line shows variation of the ratio value while the lock-up mechanism is in the non-lock-up state, two-dotted line shows the variation of the ratio value while the lock-up mechanism is in the lock-up state.

Reference ratio values (R1) and (R2) are thus set corresponding to the difference between the variations of both these ratio values. As a result, timing in the vicinity of completion of the shifting operation (P1) judged in the non-lock-up state is concurrent with timing in the vicinity of completion of the shifting operation P2 is judged in the lock-up state.

Figure 5A:
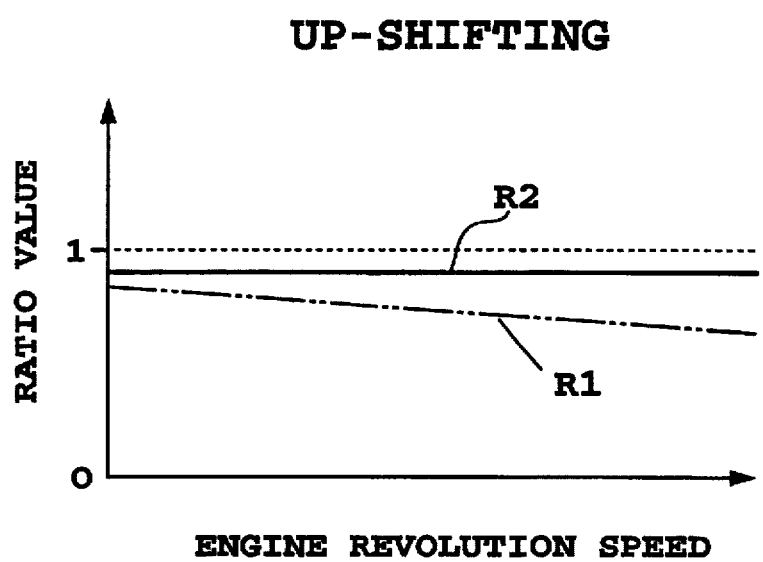
FIGS. 5A and 5B are explanatory illustrations showing a reference ratio value modified by the reference ratio modifying portion of FIG. 2.
Figure 5B:
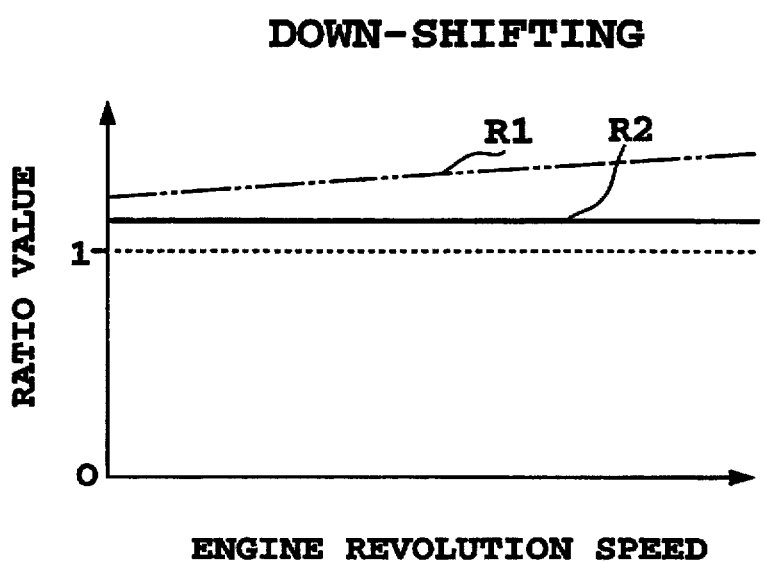
Figure 6A:
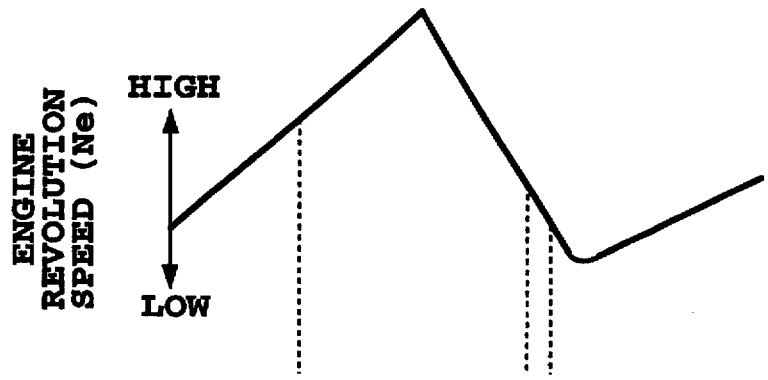
FIGS. 6A, 6B, and 6C are explanatory illustrations for explaining an operation for judgement of a timing in the vicinity of completion of shifting operation in the prior art.
Figure 6B:
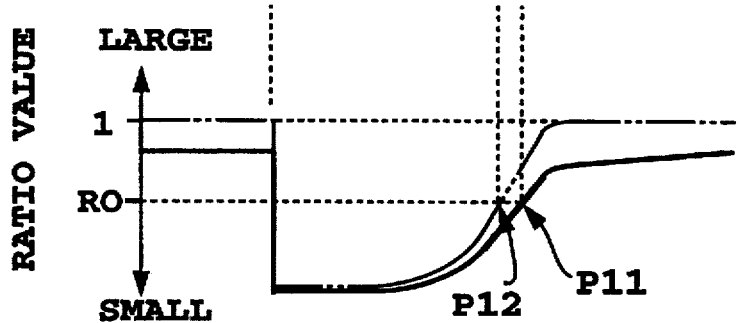
Figure 6C:

Moreover, reference ratio values (R1) and (R2) are selectively set depending upon the result of judgement at step S1, namely depending upon up-shifting or down-shifting. Also, the reference ratio values are set as shown by FIGS. 5A and 5B depending upon the engine revolution speed (Ne). Upon up-shifting, transmission gear ratio (Gn) after shifting becomes smaller, the ratio value as derived through calculation of (Gn·Np)/Ne becoming smaller than "1". On the other hand, upon down-shifting, the transmission gear ratio Gn after shifting becomes greater, the ratio value as derived through calculation of (Gn·Np)/Ne becoming greater than "1". As set forth above, in consideration of the calculated value of the ratio value, upon up-shifting, reference ratio value (R2) for the lock-up state is set at a given constant value, and the ratio value for the non-lock-up state is set at a value smaller than reference ratio value (R2) and becomes smaller value as increasing the engine revolution speed, as shown in FIG. 5A. On the other hand, upon down-shifting, reference ratio value (R2) for the lock-up state is set at a given constant value, and reference ratio value (R1) for the non-lock-up state is set at a value greater than reference ratio value (R2) and becomes greater as increasing the engine revolution speed, as shown in FIG. 5B.

Furthermore, ratio values (R1) and (R2) may be further modified depending upon the transmission speed range after a shifting operation. In such case, ratio values (R1) and (R2) may be read out from various maps depending upon the transmission speed range after shifting. On the other hand, it is also possible to modify ratio values (R1) and (R2) utilizing a result of detection of a throttle valve open angle as an engine load, in place of the engine revolution speed (Ne).

Thus, in the shown embodiment, timing (P1) or (P2) in the vicinity of completion of the shifting operation can be detected accurately on the basis of reference ratio values (R1) and (R2). Therefore, by temporarily lowering the driving torque of the engine 2 at timing.

Timing (P1) or (P2) in the vicinity of completion of the shifting operation, a shift shock can be certainly reduced. Also, it is possible to control a line pressure of the automatic power transmission 10 or to release lock-up state or to switch a slip ratio with taking the transmission speed range and/or the throttle valve open angle, at the accurate timing in the vicinity of completion of the shifting operation.

As set forth above, the control method and the control system for the automatic power transmission according to the present invention can accurately detect the state of progress of the shifting operation in the automatic power transmission irrespective of the state of the lock-up mechanism in the torque converter, by calculating the data for detecting the state of progress of the shifting operation in the automatic power transmission on the basis of the engine revolution speed, the rotation speed of the output shaft of the automatic power transmission and the transmission gear ratio at the transmission speed range after shifting in the automatic power transmission, and, upon making judgement for the timing in the vicinity of completion of the shifting operation by comparing the calculated data and the reference data, by modifying the reference data depending upon the engaging condition of the lock-up mechanism of the torque converter.

Also, according to the preferred construction, the state of progress of the shifting operation in the automatic power transmission can be accurately detected by also modifying the reference data on the basis of at least one of the transmission speed range of the automatic power transmission, the engine revolution speed (Ne) and the engine load, or depending upon shifting direction, i.e. up-shifting or down-shifting, in the automatic power transmission.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments that can be embodied within a scope encompassed and equivalents thereof with respect to the feature set out in the appended claims.

What is claimed is:

1. A method for controlling an automatic power transmission assembled with a torque converter, including a lock-up mechanism by detecting a state of progress of a shifting operation in said automatic power transmission, comprising the steps of:

obtaining data indicative of the state of progress of the shifting operation of the automatic power transmission on the basis of a value determined by multiplying a transmission gear ratio (Gn) at a transmission steed range of the automatic power transmission after shifting with a rotation speed (Np) of an output shaft of said automatic power transmission and dividing with a revolution speed (Ne) of an engine connected to said torque converter;

detecting a state of said lock-up mechanism between a lock-up state and a non-lock-up state;

obtaining a predetermined reference data;

modifying said reference data depending upon the state of said lock-up mechanism;

judging a timing in the vicinity of completion of the shifting operation and outputting a judgement signal when the calculated data reaches said reference data; and reducing a shift shock of the shifting operation in response to said judgement signal.

2. A method as set forth in claim 1, further comprising the step of modifying said reference data on the basis of at least one of a transmission speed range, the engine revolution speed (Ne) and an engine load.

3. A method as set forth in claim 1, further comprising the step of modifying said reference data depending upon up-shifting or down-shifting of the shifting operation in the automatic power transmission.

4. A system for controlling an automatic power transmission assembled with a torque converter, including a lock-up mechanism by detecting a state of progress of a shifting operation in said automatic power transmission, comprising:

engine revolution speed detecting means for detecting a revolution speed (Ne) of an engine connected to said torque converter;

output shaft rotation speed detecting means for detecting rotation speed (Np) of an output shaft of said automatic power transmission;

transmission gear ratio detecting means for detecting a transmission gear ratio (Gn) at a transmission speed range in said automatic power transmission after shifting;

arithmetic means for obtaining data indicative of the state of progress of the shifting operation of the automatic power transmission by multiplying said transmission gear ratio (Gn) with said rotation speed (Np) and dividing with said revolution speed (Ne);

engaging state detecting means for detecting a state of said lock-up mechanism between a lock-up state and a non-lock-up state;

obtaining a predetermined reference data;

reference data modifying means for modifying said reference data depending upon the state of said lock-up mechanism;

judgement means for detecting a timing in the vicinity of completion of the shifting operation and outputting a judgement signal when the calculated data reaches said reference data; and means for reducing a shift shock of the shifting operation in response to said judgement signal.

5. A system as set forth in claim 4, wherein said reference data modifying means modifies said reference data on the basis of at least one of a transmission speed range, the engine revolution speed (Ne), and an engine load.

6. A system as set forth in claim 4, wherein said reference data modifying means modifies said reference data depending upon up-shifting or down-shifting of the shifting operation in the automatic power transmission.

7. A system for controlling an automatic power transmission, which includes a torque converter with a lock-up mechanism, comprising:

first means for detecting an engine speed (Ne) of an engine connected to the automatic power transmission through said torque converter;

second means for detecting an output speed (Np) of the automatic power transmission;

third means for deriving data indicative of a state of progress of shifting of transmission speed range from one transmission speed range to another transmission speed range on the basis of said engine speed (Ne), said output speed (Np) and a known transmission gear ratio (Gn) at said another transmission speed range;

fourth means for detecting a state of said lock-up mechanism;

fifth means for obtaining and modifying shift completion indicative reference data on the basis of the state of said lock-up mechanism detected by said fourth means;

sixth means for comparing said data derived by said third means with said reference data modified by said fifth means and for judging a timing where shifting of transmission speed range from said one transmission speed range to said another transmission speed range is about completion and outputting a judgement signal when said derived data reaches said reference data; and seventh means for reducing a shift shock of the shifting operation in response to said judgement signal.

8. A system as set forth in claim 7, wherein said fourth means detects a state of said lock-up mechanism on the basis of magnitude of slippage across said torque converter.

9. A system as set forth in claim 7, wherein said reference date comprises a first reference ratio value (R1) for the non-lock-up state of said lock-up mechanism and a second reference ratio value (R2) for the lock-up state of said lock-up mechanism.

10. A system as set forth in claim 9, wherein said fifth means modifies said second reference ratio value (R2) at a given constant value and said first reference ratio value (R1) at a value smaller than said second reference ratio value (R2) and becoming smaller as increasing the engine speed (Ne) when up-shifting.

11. A system as set forth in claim 9, wherein said fifth means modifies said second reference ratio value (R2) at a given constant value and said first reference value (R1) at a value greater than said second reference ratio value (R2) and becoming greater as increasing the engine speed (Ne) when down-shifting.

12. A method as set forth in claim 1, wherein said step of reducing shift shock comprises at least one of lowering a driving torque of said engine, controlling a line pressure of said automatic power transmission, and releasing a lock-up state of said lock-up mechanism or switching a slip ratio of said lock-up mechanism.

13. A system as set forth in claim 4, wherein said shift shock reducing means comprises at least one of means for lowering a driving torque of said engine, means for controlling a line pressure of said automatic power transmission, and means for releasing a lock-up state of said lock-up mechanism or switching a slip ratio of said lock-up mechanism.

14. A system as set forth in claim 7, wherein said seventh means comprises at least one of means for lowering a driving torque of said engine, means for controlling a line pressure of said automatic power transmission, and means for releasing a lock-up state of said lock-up mechanism or switching a slip ratio of said lock-up mechanism.

* * * * *